United States Patent [19]

Ballestrazzi et al.

[11] Patent Number: 5,439,550
[45] Date of Patent: Aug. 8, 1995

[54] APPARATUS FOR LONGITUDINAL WELDING WITH FAST AND RELIABLE TRIMMED SCRAP REMOVAL

[75] Inventors: Aris Ballestrazzi; Lamberto Tassi, both of Savignano Sul Panaro, Italy

[73] Assignee: Sitma S.p.A., Modena, Italy

[21] Appl. No.: 149,527

[22] Filed: Nov. 9, 1993

[30] Foreign Application Priority Data

Nov. 11, 1992 [IT] Italy .................. MI92U0977

[51] Int. Cl.⁶ .................. B32B 35/00; B65B 51/14; B26D 7/18
[52] U.S. Cl. .................. 156/515; 156/580; 156/583.1; 53/373.4; 53/374.5; 83/119; 83/923
[58] Field of Search .......... 156/515, 285, 382, 583.1; 53/284, 373.4, 374.5, 377.7, 479, 374.6, 370.4, 370.5; 83/102, 105, 107, 109, 111, 119, 129, 130, 134, 135, 137, 914, 923

[56] References Cited

U.S. PATENT DOCUMENTS

| | | | |
|---|---|---|---|
| 2,641,304 | 6/1953 | Biddinger et al. | 53/373.4 |
| 3,471,990 | 10/1969 | Bonuchi et al. | |
| 3,574,039 | 4/1971 | Fehr et al. | 156/515 |
| 3,765,990 | 10/1973 | Histed et al. | 156/515 |
| 3,782,072 | 1/1974 | Sorenson et al. | 156/515 X |
| 3,794,315 | 2/1974 | Kaneko et al. | 53/374.6 X |
| 4,219,988 | 9/1980 | Shanklin et al. | 53/374.6 X |
| 4,362,593 | 12/1982 | Grevich | 53/374.6 X |
| 4,680,073 | 7/1987 | Brunner et al. | |
| 5,056,292 | 10/1991 | Natterer | 53/373.4 X |

FOREIGN PATENT DOCUMENTS

| | | |
|---|---|---|
| 2116397 | 7/1972 | France . |
| 2755860 | 1/1979 | Germany . |
| 2827535 | 1/1980 | Germany . |
| 547748 | 4/1974 | Switzerland . |

*Primary Examiner*—David A. Simmons
*Assistant Examiner*—M. Curtis Mayes
*Attorney, Agent, or Firm*—Oblon, Spivak, McClelland, Maier & Neustadt

[57] ABSTRACT

An apparatus for longitudinal welding with fast and reliable scrap removal, suitable for being coupled with a product conveyor for conveying products to be packaged inside a plastic material sheet comprising a saddle (16), capable of being reciprocated in longitudinal direction, above which a longitudinal welding unit (15) is provided, which is constituted by at least one welder bar (23) and one counter-welder bar (20), wherein at least one of the latter elements (23, 20) can be either downwards or upwards shifted in order to interact with the other of said elements (20, 23) and generate a longitudinal side seam (40) on the product (38) partially wrapped inside the plastic material, in which beside the welder bar (23) and the counter-welder bar (20) a pressing element (27) and a counte-pressing element (29) are longitudinally installed facing outwards, which clamp a longitudinal portion of the packaging plastic material, with at least one of said pressing and counter-pressing elements (27, 29) being suitable for being laterally turned over by means of an actuator means (34), and at least one of said elements (27, 29) being provided with a drive roller (27) for a plastic material trimmed scrap (41).

5 Claims, 2 Drawing Sheets

APPARATUS FOR LONGITUDINAL WELDING WITH FAST AND RELIABLE TRIMMED SCRAP REMOVAL

BACKGROUND OF THE INVENTION

1. Field of the Invention

The present invention relates to a longitudinal welding apparatus with fast and reliable trimmed scrap removal.

2. Discussion of the Background

In packaging materials for product packaging, in particular with plastic packaging materials, longitudinal welding apparatuses are used which seal the package which is already provided with cross welded seams.

By means of this further longitudinal welding, in general, either a complete sealing of the package is carried out, or at least the package is laterally trimmed, depriving it of the excess, protruding plastic material.

However, in both cases, owing to the fact that these side trimmed scraps are defined by a so-said "cutting-welding" operation, they are not always completely and/or: correctly separated from the package. So, annoying overhanging, not separated appendices are generated which hamper possible subsequent package :treatment operations.

On considering these problems, according to the prior art, beside the longitudinal welding apparatus trimmed scrap sucking devices have been installed which try to tear it, in the event that it has not been completely detached.

Unfortunately, even this arrangement is not capable of securing the complete detachment of the trimmed scrap, which, sometimes, remains sticking to the welding unit, because it gets melted and sticks to the welding head.

SUMMARY OF THE INVENTION

The purpose of the present invention is of providing a longitudinal welding apparatus with fast and reliable trimmed scrap removal also when said trimmed scrap is not completely detached, or is sticking to the welding unit.

This purpose according to the present invention is achieved by providing an apparatus for longitudinal welding with fast and reliable trimmed scrap removal, suitable for being coupled with a conveyor means for products to be packaged inside a plastic material sheet, or inside a plastic material film supplied from a bobbin, which apparatus comprises a saddle or carriage, suitable for being reciprocated in longitudinal direction, above which a longitudinal welding unit is provided, which is constituted by at least one welder bar and one counter-welder bar, wherein at least one of said welder and counter-welder bars can be either downwards or upwards shifted in order to interact with the other of said elements and determine a longitudinal side seam on said product partially wrapped inside said plastic material, characterized in that beside said welder bar and counter-welder bar a pressing element and a counter-pressing element are longitudinally installed facing outwards, which clamp a longitudinal portion of said packaging plastic material, with at least one of said pressing and counter-pressing elements being suitable for being laterally turned over by means of a relevant actuator means, and at least one of said elements being provided with a drive roller for a plastic material trimmed scrap.

BRIEF DESCRIPTION OF THE DRAWINGS

The characteristics and advantages of an apparatus according to the present invention will be better understood from the following exemplifying, non-limited disclosure made by referring to the accompanying schematic drawings, in which.

DESCRIPTION OF THE PREFERRED EMBODIMENTS

Figure 1:
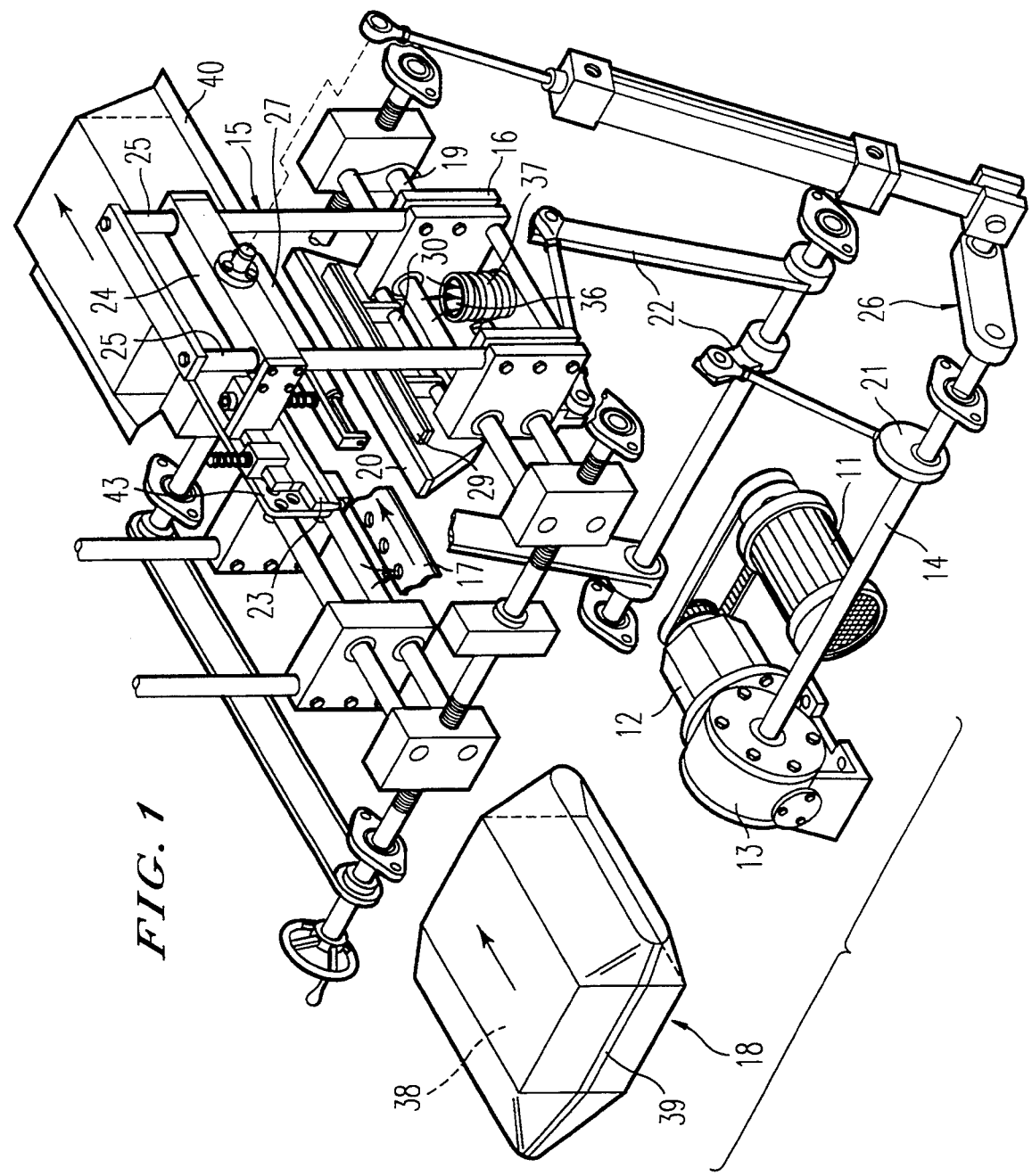
FIG. 1 is a perspective view of a longitudinal welding apparatus, a half of which is partially shown, according to the present invention.
Figure 2:
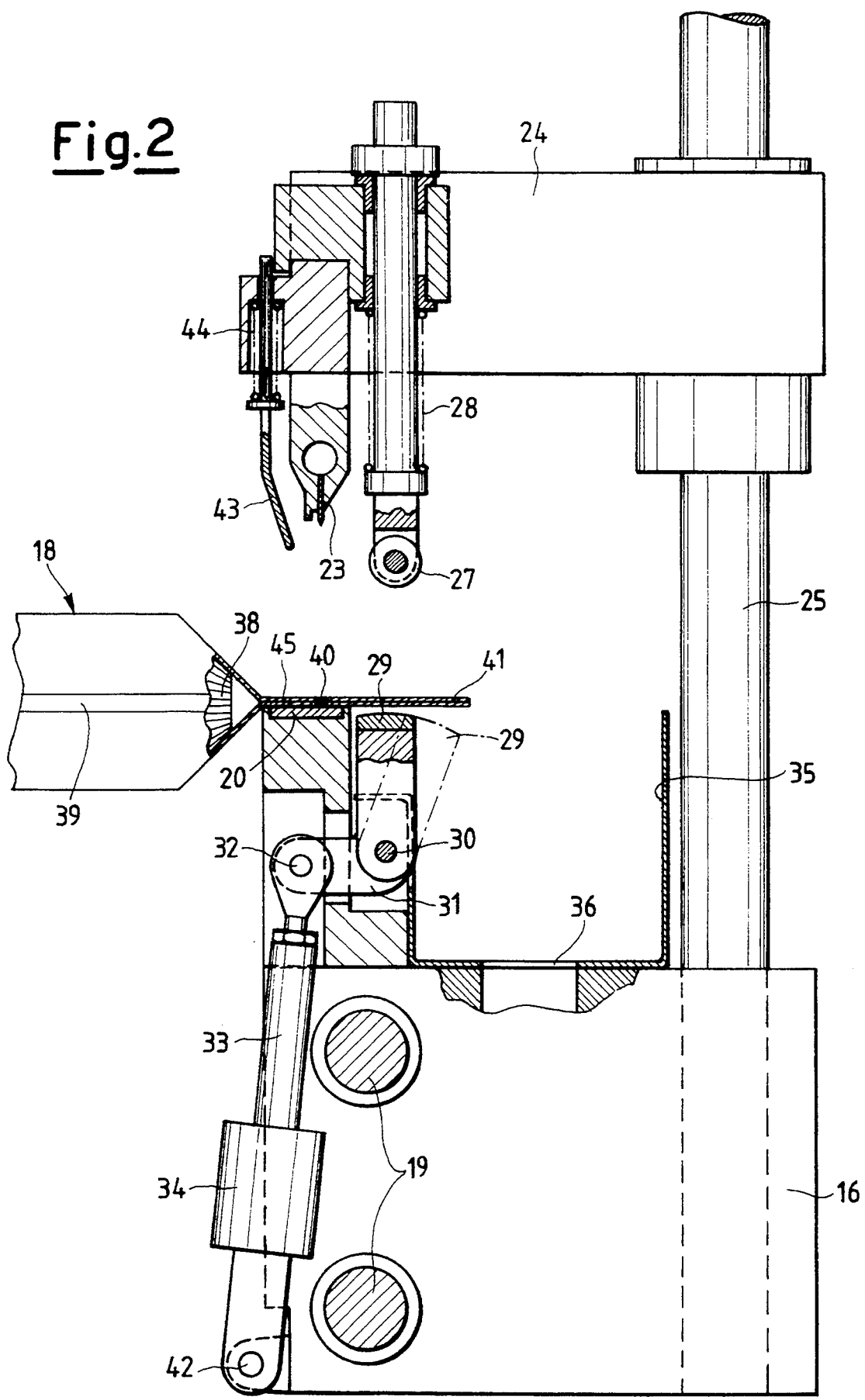
FIG. 2 is partial elevational, magnified sectional view of a welder unit of an apparatus of FIG. 1.

FIG. 1 shows, at least partially, in perspective view, a longitudinal welding apparatus with fast and reliable removal of the trimmed scrap according to the present invention.

In usual way, the above said apparatus is supplied with motive power by a motor means 11 which, through a brake-clutch coupling 12 transmits the motion to a reducer gear 13 and then to a drive shaft 14.

The drive shaft 14 drives the motion of a longitudinal welding unit 15, as well as the reciprocating motion, in longitudinal direction, of a saddle or carriage 16 above which the welding unit 15 is installed.

In FIG. 1, only a half is shown of the devices installed above the saddle or carriage 16, symmetrically and on opposite sides relatively to a conveyor belt, partially schematically shown in 17, of a sucking type, for conveying packages 18, only trasversally sealed, which should be also longitudinally sealed at their side portions.

The saddle/carriage can be horizontally moved along guide uprights 19 and on its bottom portion supports a stationary, upwards facing, counter-welder bar 20. The movement of the saddle 16 is driven, according to a known way, by means of an eccentric element 21 provided on the drive shaft 14, and through an articulated lever system 22 linked, on the one side thereof, to said eccentric element 21, and, at its other side, to the same saddle 16.

A welder element 23, for example of the hot bar type, is supported, in its turn, on a slider 24 suitable for be vertically shifted on further vertical uprights 25 integral with the saddle 16. The lowering/lifting movement of the slider 24 bearing the welder element 23 is supplied by a connecting rod/crank system linked, on one side, to the drive shaft 14, and at it is other side, to said slider 24.

Beside the welder element 23, a pressing element is installed which comprises an idle roller 27 rotatably supported and urged downwards by springs 28, and beside the counter-welder element 20, a counter-pressing element 29 is analogously installed. Said counter-pressing element 29 is constituted by an over turnable element with an upper bent profile, which can swing around a pivot 30 by means of a bell crank end 31 thereof linked, through a pin 32, to the free end of the stem 33 of a cylinder 34 hinged, at its bottom end, in 42. Beside the welder element 23, on the opposite side relatively to the roller 27, a further pressing element 43 is provided, which is constituted, e.g., by a shaped sheet. Such a pressing element 43 is installed integral with the slider 24, with elastic elements 44 being interposed, and interacts with the upper surface of the counter-welder element 20.

Also arranged beside the counter-pressing element 29, a tank 35 is provided, through the bottom of which an opening 36 is provided which is connected with a sucking tube 37.

One will so understand that, during the operation of packaging of product 38, the latter is initially wrapped inside a sheet, or a portion of a sheet, of a plastic material in sheet form, or in a plastic material film sup plied from a bobbin, which is constrained to the product 38 through at least one transversal welding seam 39, provided by a known, not displayed device.

The product 38, contained inside the package 18 only transversally sealed in 39, is fed by the conveyor belt 17 towards and under the longitudinal welding unit 15.

Such a longitudinal welding unit 15 is moved on the saddle/carriage 16 in synchronism with the movement of the conveyor belt 17, and simultaneously produces side longitudinal welding seams 40 on the package 18, thus sealing it at its sides.

The interaction between the welder element 23 and the counter-welder element 20, besides generating the longitudinal welding seams 40, generates strips of trimmed scrap material 41, referred to as "trimmed scraps", which must be separated from the package 18, or from a residual longitudinal edge 45 of package 18.

During this welding step, such trimmed scraps 41 are clamped betweed the pressing roller 27 and the counter-pressing element 29, and, simultaneously, the longitudinal edge 45 is clamped between the pressing element 43 and the counter-pressing element 20.

Thereafter, the welder element 23 starts rising and the cylinder 34 is actuated, with its stem 33 being consequently extended of the stem 33 outwards, which causes the counter-pressing element 29 to swing sliding on the pressing roller 27. This action simultaneously causes also the trimmed scrap 41 contained betweed said elements 27 and 29 to be dragged outwards, thus being reliably separated from the package 18. In fact, during this step the interaction continues between the pressing element 43 and the counter pressing element 20, which causes the longitudinal edge 45 to remain clamped. After that, also the pressing element 43 is moved upwards and simultaneously the trimmed scrap 41 is released and intaken by the sucking tube 37 leading to the bottom wall of the tank 35.

The presence of the overturnable counter-pressing element 29 thus secures the fast and reliable detachment of the trimmed scrap 41 throughout the package length also if the package trimming takes place without continuity and in a non-uniform way.

The package results thus finished and free from any undesired appendices constituted by partially unremoved plastic material.

In the meanwhile, the overturnable counter-pressing element 29 prevents the trimmed scrap 41 accidentally stickling to the welder element 23 or to the counter-welder element 20 from remaining there damaging the subsequent welding operations and causing a stoppage of the packaging apparatus.

Of course, in an equivalent way, the roller 27 can be arranged on the bottom counter-pressing element 29, and the overturning capability may be transferred to the upper pressing element 28.

We claim:

1. An apparatus for longitudinal welding and trimmed scrap removal which can be coupled to a product conveyor for conveying products to be packaged in a plastic sheet material or a plastic film material comprising:
    a carriage reciprocating in a longitudinal direction;
    a longitudinal welding unit disposed on said carriage, said longitudinal welding Unit including at least one welder element and one counter-welder element, with said welder element movable toward and away from said counter-welder element to form a longitudinal seam in a plastic material of a package within which a product is at least partially wrapped, and wherein a pressing element is disposed adjacent said welder element and a counter-pressing element is disposed adjacent said counter-welder element such that said pressing element and said counter-pressing element clamp a longitudinal portion of said plastic material, the longitudinal welding unit further including an actuator for laterally turning said counter-pressing element, and wherein said pressing element includes a roller;
    wherein said welder element and said counter-welder element are disposed adjacent to a conveyer upon which packages to be sealed are fed to thereby longitudinally seal a side end portion of said packages;
    said actuator of said counter-pressing element including an actuator cylinder having a stem which is connected to a bell crank by a pin, and wherein said counter-pressing element is laterally turned over about a pivot by said actuator and said bell crank; and
    a sucking element disposed adjacent said counter-pressing element for sucking a trimmed scrap, said sucking element including a tank having an opening at a bottom thereof which is connected to a suction tube, and wherein said counter-pressing element turns toward said sucking element such that trimmed scraps are deposited in said sucking element.

2. The apparatus of claim 1, further including an additional pressing element adjacent said welder element on a side of said welder element opposite to said roller such that said welder element is between said roller and said additional pressing element, said additional pressing element interacting with said counter-welder element upon movement of said welder bar toward said counter-welder element.

3. The apparatus of claim 2, wherein said additional pressing element comprises a shaped sheet metal element.

4. The apparatus of claim 3, wherein said additional pressing element is mounted upon a slider upon which said welder element is mounted, and wherein an elastic element is interposed between said additional pressing element and said slider.

5. The apparatus of claim 1, wherein said pressing element is spring mounted Such that said roller maintains contact with said counter-pressing element after said welder element begins to move away from said counter-welder element upon completion of a seam forming operation.

* * * * *